United States Patent
Wilson et al.

(10) Patent No.: US 6,200,463 B1
(45) Date of Patent: *Mar. 13, 2001

(54) SILICON SUBSTITUTED EMC-2 ZEOLITE: LZ-281

(75) Inventors: Ben A. Wilson, Algonquin; Robert Lyle Patton, Rolling Meadows; Vinayan Nair, Darien; Deng-Yang Jan, Elk Grove Village; Hemant B. Gala, Arlington Heights, all of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/366,513

(22) Filed: Aug. 3, 1999

Related U.S. Application Data

(63) Continuation-in-part of application No. 08/801,333, filed on Feb. 19, 1997, now Pat. No. 5,985,782.

(51) Int. Cl.⁷ .............................. B01J 29/06; C10G 47/00
(52) U.S. Cl. ...................... 208/111.01; 502/85; 423/713
(58) Field of Search ...................... 502/85, 86; 423/713, 423/DIG. 21; 208/110, 111.01

(56) References Cited

U.S. PATENT DOCUMENTS

| | | | |
|---|---|---|---|
| 4,576,805 | 3/1986 | Chang et al. | 423/277 |
| 4,711,700 | 12/1987 | Skeels et al. | 423/328 |
| 4,845,063 | 7/1989 | Chu | 502/60 |
| 5,425,934 | 6/1995 | Malla et al. | 423/714 |
| 5,773,660 | 6/1998 | Eller et al. | 564/485 |
| 5,985,782 | * 11/1999 | Wilson et al. | 502/85 |

OTHER PUBLICATIONS

F. Delprato et al., Zeolites, 10, 546–552(1990).

Ch. Baerloher, Acta Cryst., A46, C177 (1990).

"Dealumination of Hexagonal (EMT)/Cubic (FAU) Zeolite Intergrowth Materials: A SEM and HRTEM Study", T. Ohsuna et al., Chemistry of Materials, vol. 6, No. 12, 1994, pp. 2201–2204.

* cited by examiner

*Primary Examiner*—Tom Dunn
(74) *Attorney, Agent, or Firm*—John G. Tolomei; Frank S. Molinaro

(57) ABSTRACT

Applicants have prepared a novel zeolite identified as LZ-281. This zeolite has the framework topology of zeolite EMT. The LZ-281 zeolite is prepared by removing framework aluminum atoms from EMC-2 zeolite while simultaneously replacing the aluminum atoms with extraneous silicon atoms. This increases the $SiO_2/Al_2O_3$ ratio versus the starting EMC-2 zeolite and results in the LZ-281 zeolite having increased thermal stability, increased number and/or strength of acid sites and increased activity in hydrocarbon processes requiring strong acid sites.

6 Claims, 1 Drawing Sheet

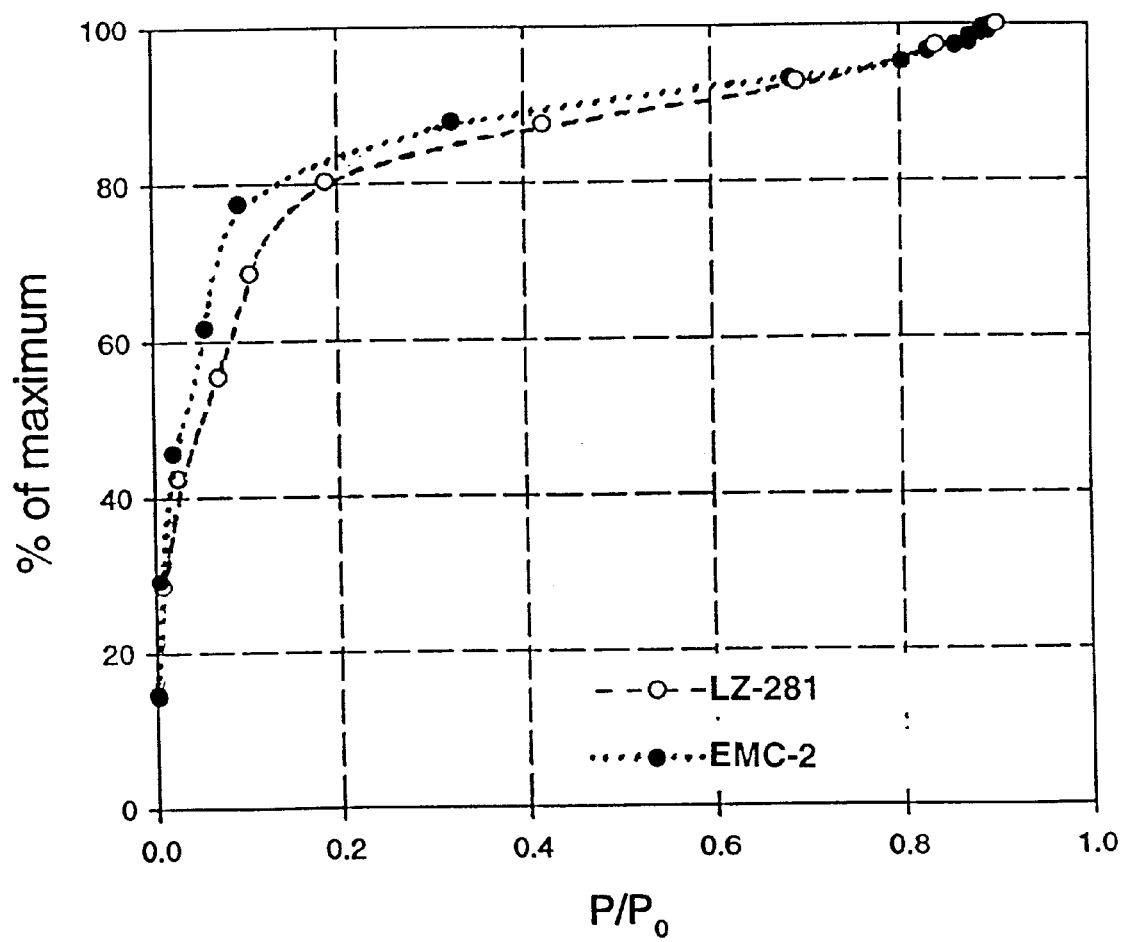

SILICON SUBSTITUTED EMC-2 ZEOLITE: LZ-281

CROSS REFERENCE TO RELATED APPLICATION

This application is a continuation-in-part of U.S. application Ser. No. 08/801,333 filed on Feb. 19, 1997, now U.S. Pat. No. 5,985,782 all of which is incorporated by reference.

FIELD OF THE INVENTION

This invention relates to novel zeolite compositions having the framework topology of zeolite EMT in which some of the framework aluminum atoms have been removed and replaced by extraneous silicon atoms. The novel zeolite is identified as LZ-281, is derived from EMC-2 and has a $SiO_2/Al_2O_3$ ratio higher than that of the starting EMC-2 zeolite.

BACKGROUND OF THE INVENTION

Molecular sieves of the crystalline aluminosilicate zeolite type are well known in the art and now comprise over 150 species of both naturally occurring and synthetic compositions. In general, the crystalline zeolites are formed from corner-sharing $AlO_2$ and $SiO_2$ tetrahedra and are characterized by having pore openings of uniform dimensions, having a significant ion-exchange capacity and being capable of reversible desorbing an adsorbed phase which is dispersed throughout the internal voids of the crystal without significantly displacing any atoms which make up the permanent crystal structure.

One of these synthetic zeolites is EMC-2, which is composed of sodalite cages arranged in a hexagonal array and has been designated as having the EMT framework structure by the International Zeolite Association (See, Atlas of Zeolite Structure Types, W. M. Meier and D. H. Olson, 3d Edition (1992), Butterworth-Heinemann). The EMC-2 zeolite is synthesized using the organic directing agent 18-crown-6-ether. Synthesis of this zeolite as well as structure characterization has been reported in the following: F. Delprato et al., Zeolites, 10, 546–552 (1990); Ch. Baerlocher, Acta Cryst., A46, C177 (1990).

As synthesized, the EMC-2 zeolite has a $SiO_2/Al_2O_3$ ratio from about 6.5 to about 10.0. Applicants have successfully treated EMC-2 zeolites with a fluorosilicate salt to simultaneously remove aluminum atoms and insert silicon into the framework, thereby giving a $SiO_2/Al_2O_3$ ratio of about 6.6 to about 11.2. The zeolite obtained from this process has been identified as LZ-281, has retained the EMT framework structure and at least 50% (preferably 90%) of the relative X-ray crystallinity of the starting EMC-2 zeolite. It is also observed that the LZ-281 zeolite has increased acidity and cracking activity.

U.S. Pat. No. 5,425,934 discloses dealuminating an EMT zeolite by contacting the parent zeolite with a 1M methanolic HCl solution. However, the '934 reference does not mention adding silicon back into the sites vacated by the aluminum. That is, the LZ-281 of the invention will have less defect sites than the EMT zeolite of the '934 reference.

U.S. Pat. No. 4,711,770 discloses a process for treating a zeolite with a fluorosilicate salt. The '770 patent discloses treating a zeolite Y with a fluorosilicate salt, thereby removing aluminum atoms from the framework and inserting silicon. However, the '770 patent does not disclose treating an EMC-2 zeolite.

BRIEF DESCRIPTION OF THE FIGURE

The FIGURE presents water adsorption isotherms for the EMC-2 of example 1 and the LZ-281 of example 2.

SUMMARY OF THE INVENTION

The present invention relates to a novel zeolite composition and processes using the composition. Accordingly, one embodiment of the invention is a crystalline zeolitic aluminosilicate composition having at least some of its original framework aluminum atoms replaced by extraneous silicon atoms and having a mole ratio of oxides in the anhydrous state of $$aM_{2/n}O:Al_2O_3:xSiO_2$$

where M is a cation of valence "n", "a" has a value of about 0.90±0.2 and "x" has a value of greater than 11, the composition characterized in that it has the framework structure of EMT, a cation equivalency of at least 0.7 and an oxygen adsorption capacity of at least 70% of its theoretical capacity as measured at 100 torr and 90° K.

Another embodiment of the invention is a hydrocarbon conversion process using the zeolite composition described above. The process comprises contacting a hydrocarbon fraction at hydrocarbon conversion conditions with said zeolite composition to give a converted product.

These and other embodiments will become more apparent after a detailed description of the invention.

DETAILED DESCRIPTION OF THE INVENTION

The instant invention relates to a novel zeolitic aluminosilicate composition, a process for preparing the composition and processes using the composition. The composition of this invention is represented by an empirical formula expressed in terms of mole ratios of the oxides of:

$$aM_{2/n}O:Al_2O_3:xSiO_2$$

where M is a cation of valence "n", "a" has a value of about 0.90±0.2 and "x" has a value of at least 11. The composition has a X-ray powder diffraction pattern consistent with the framework topology of EMT and has at least some of its original framework aluminum atoms replaced by extraneous silicon atoms. These zeolites are derived from ammonium EMC-2 zeolite. The zeolite of this invention, i.e., the product zeolite, will be identified as LZ-281. The M cation is selected from the group consisting of ammonium, hydronium, alkali metals, alkaline earth metals and mixtures thereof.

For purposes of reference herein, the framework composition is best expressed in terms of mole fraction of framework $TO_2$. Thus, the starting EMC-2 zeolite is expressed by the formula:

$$(Al_aSi_b[\ ]_z)O_2$$

where "a" is the mole fraction of aluminum atoms in the framework; "b" is the mole fraction of silicon atoms in the framework; "[ ]" denotes defect sites in the framework; and "z" is the mole fraction of defect sites in the zeolite framework. In some cases the "z" value for the starting zeolite is zero and the defect sites are simply eliminated from the expression. Numerically the sum of the values a+b+z=1.

If defect sites are present, then the zeolite composition of this invention can have a unit empirical formula expressed in terms of the mole fractions of framework tetrahedra ($TO_2$) of:

$$(Al_{(a-N)}Si_{b+(N-\Delta z)}[\ ]_{z_1})O_2$$

where: "N" is defined as the mole fraction of aluminum atoms removed from the framework during the treatment and is at least 0.03a; "a" is the mole fraction of aluminum atoms present in the framework of the starting EMC-2 zeolite; "b" is the mole fraction of silicon atoms present in the framework of the starting EMC-2; "[ ]" is the framework defect sites; "z1" is the mole fraction of defect sites in the product zeolite framework and varies from greater than zero to about 0.15, "Δz" is the net change in the mole fraction of defect sites resulting from the process, is defined as Δz=z1−z and has a value of less than 0.08 and preferably less than 0.05 and (N−Δz) is the mole fraction increase in silicon in the product LZ-281 zeolite. Numerically, the sum of the values: (a−N)+(b+(N−Δz))+z1=1.

The starting EMC-2 is prepared by means known in the art. See, F. Delprato et al., *Zeolites,* Vol. 10 (1990), pp. 546–552. Generally, the EMC-2 zeolite is prepared by forming a reaction mixture containing a source of silicon, aluminum, plus 18-Crown-6 ether, an alkali salt and water. The mixture is digested at a temperature of about 110° C. for about 6 days. The resultant product is isolated, washed and dried at 110° C. Next the EMC-2 zeolite can be converted to the ammonium form by calcining the as-synthesized zeolite at a temperature of about 540° C. for 6 hours. Ammonium exchange is carried out by contacting the calcined EMC-2 zeolite with an ammonium nitrate solution at a temperature of about 85° C., followed by a water wash and then drying at 110° C. As stated, the starting EMC-2 zeolite will have a $SiO_2/Al_2O_3$ molar ratio of about 6.0 to about 10.0.

The LZ-281 zeolite of this invention is prepared by contacting and reacting at a temperature of about 20° C. to about 95° C. the starting ammonium zeolite EMC-2 with a fluorosilicate salt. The fluorosilicate salt serves two purposes. It removes aluminum atoms from the framework and provides a source of extraneous silicon which can be inserted into the framework (replacing the aluminum). The fluorosilicate salts which can be used are those described by the general formula

$$A_{2/n}SiF_6$$

where "n" is the valence of A and A is a cation selected from the group consisting of $NH_4^+$, $H^+$, $Mg^{+2}$, $Li^+$, $Na^+$, $K^+$, $Ba^{+2}$, $Cd^{+2}$, $Cu^+$, $Cu^{+2}$, $Ca^{+2}$, $Cs^+$, $Fe^{+2}$, $Ca^{+2}$, $Pb^{+2}$, $Mn^{+2}$, $Rb^+$, $Ag^+$, $Sr^{+2}$, $Tl^+$, and $Zn^{+2}$. The ammonium fluorosilicate is most preferred because of its substantial solubility in water and because it forms water soluble by-product salts upon reaction with the zeolite, namely $(NH_4)_3AlF_6$.

The fluorosilicate salt is contacted with the EMC-2 zeolite in the form of an aqueous solution or slurry at a pH in the range of about 3 to about 7. This solution is contacted with the zeolite either incrementally or continuously at a slow rate such that a sufficient proportion of the framework aluminum atoms removed are replaced by silicon atoms to retain at least 50%, preferably at least 90% of the framework (crystalline) structure of the starting EMC-2 zeolite. The amount of fluorosilicate necessary to carry out the process of this invention can vary considerably, but should be at least in an amount of 0.0075 moles of fluorosilicate salt per 100 grams of starting zeolite. Once the reaction is complete, the product zeolite LZ-281 is isolated by conventional techniques such as filtration.

The process of removing aluminum and inserting the silicon appears to proceed in two steps in which the aluminum extraction step will, unless controlled, proceed very rapidly while the silicon insertion is relatively slow. If dealumination becomes too extensive without silicon substitution, the crystal structure becomes seriously degraded and ultimately collapses. In general, the rate of aluminum extraction is decreased as the pH of the fluorosilicate solution in contact with the zeolite is increased within the range of about 3 to about 7 and as the concentration of the fluorosilicate in the reaction system is decreased. At pH values below about 3, crystal degradation is generally found to be unduly severe, whereas at pH values higher than 7, silicon insertion is unduly slow. Also, increasing the reaction temperature tends to increase the rate of substitution of silicon. Increasing the reaction temperature has been found to have less of an effect on dealumination than the pH of the solution. Therefore, the pH may be considered a means of controlling dealumination while temperature may be considered as a means of controlling the substitution rate.

Theoretically, there is no lower limit for the concentration of fluorosilicate salt in the aqueous solution employed, provided, of course, the pH of the solution is high enough to avoid undue destructive acidic attack on the EMT zeolite structure apart from the intended reaction with the fluorosilicate. A slow rate of addition of fluorosilicate salts insures that adequate time is permitted for the insertion of silicon into the framework before excessive aluminum extraction occurs with consequent collapse of the crystal structure. In general the effective reaction temperature is within the range between about 10° C. and about 99° C., preferably between about 20° C. and 95° C., but temperatures of 125° C. or higher and as low as 0° C. can be used.

The maximum concentration of fluorosilicate salt in the aqueous solution employed is, of course, interrelated to the temperature and pH factors and also with the time of contact between the zeolite and the solution and the relative proportions of zeolite and fluorosilicate salt. Solutions having fluorosilicate salt concentrations of between $10^{-3}$ moles per liter of solution and up to saturation of the solution can be employed, but it is preferred that concentrations in the range of between about 0.5 and about 2.0 moles per liter of solution be used. In addition, as hereinbefore discussed, slurries of the fluorosilicate salts may be employed. The aforementioned concentration values are with respect to true solutions, and are not intended to apply to the total fluorosilicate salts in slurries of the salts in water. Even very slightly soluble fluorosilicate salts can be slurried in water and used as a reagent, the undissolved solids being readily available to replace dissolved molecular species consumed in reaction with the zeolite. The minimum value for the amount of fluoro salt to be added is preferably at least equivalent to the minimum mole fraction of aluminum to be removed from the zeolite.

It has been found that when large amounts of silicon atoms are to be substituted, i.e., increasing the $SiO_2/Al_2O_3$ ratio by more than about 100%, it is preferable to carry out the process in multiple steps in order to minimize crystal degradation. As the amount of silicon which is substituted into the framework is substantially increased (beyond 100% increase) it may actually be necessary to carry out the process in order to prevent excessive degradation of the crystalline structure. That is, contacting with the fluorosilicate salt is carried out in two or more steps using a lower concentration of the fluorosilicate salt than that required to replace the desired amount of silicon in one step. After each fluorosilicate treatment, the product is washed to remove fluoride and aluminum. Drying of the zeolite at 50° C. between the treatments may also be done to facilitate the handling of the wet zeolite product.

In specifying the proportions of the zeolite starting material or adsorption properties of the zeolite product and the like herein, the "anhydrous state" of the zeolite will be intended unless otherwise stated. The term "anhydrous state" is employed herein to refer to a material substantially devoid of both physically adsorbed and chemically adsorbed water. In general a zeolite may be prepared in the anhydrous state by heating the zeolite in dry air at about 450° C. for about 4 hours.

It is apparent from the foregoing that, with respect to effective process conditions, it is desirable that the integrity of the zeolite crystal structure be substantially maintained throughout the process, and that, in addition to having silicon atoms inserted into the lattice, the zeolite retains at least 50 percent, preferably at least 70 and more preferably at least 90 percent of its original crystallinity. A convenient technique for assessing the crystallinity of the products relative to the crystallinity of the starting material is the comparison of the relative intensities of the d-spacings of their respective X-ray powder diffraction patterns. The sum of the peak intensities, in terms of arbitrary units above background, of the starting material is used as the standard and is compared with the corresponding peak intensities of the products. When, for example, the numerical sum of the peak intensities of the molecular sieve product is 85 percent of the value of the sum of the peak heights of the starting zeolite, then 85 percent of the crystallinity has been retained. In practice it is common to utilize only a portion of the d-spacing peaks for this purpose, as for example, five or six of the strongest d-spacings. Other indications of the retention of crystallinity are surface area and adsorption capacity. These tests may be preferred when the substituted metal significantly changes, e.g., increases, the absorption of x-rays by the sample.

Surface areas can be determined by the well-known Brunauer-Emmett-Teller method (B-E-T). See, for example, Journal of American Chemical Society, Volume 60, page 309 (1938) using nitrogen as the adsorbate. In determining the adsorption capacity, the capacity for oxygen at 90° K (−183° C.) and 100 Torr is preferred. Accordingly, the compositions of this invention are characterized in that they retain at least 60, preferably 70, and most preferably 90 percent of the capacity of the starting zeolite. Since it is preferred that the starting zeolite be highly crystalline and not have any defect, it is preferred that the instant compositions have at least 60, preferably 70, and most preferably 90 percent of its theoretical oxygen adsorption capacity as measured at 100 torr and 90° K.

The present compositions are also characterized in that they have a cation equivalency of at least 0.7. Cation equivalency is the molar ratio of $M^+/Al$ in the molecular sieve. Four-fold coordination of aluminum in the zeolite framework produces a net negative charge on the zeolite framework, requiring a cation of $M^+$ to balance the charge. The Cation Equivalent, $M^+/Al$, can be a direct measure of the amount of framework aluminum in the zeolite. Cations, here represented as the monovalent species, $M^+$, can be any cation capable of entering the zeolite pores and balancing the framework charges. Representative of such cation species are $Na^+$, $K^+$, $NH4^+$, $Ca^{++}$, $Mg^{++}$, Rare Earth$^{+++}$, $H^+$, and even hydroxoaluminum cation species $Al(OH)_2^+$, $Al(OH)^{2+}$, $AlO^+$, etc. Of course, hydroxoaluminum cations are not framework atoms, and thus when present they will have the effect of reducing the measured Cation Equivalent $M^+/Al$, since Al is taken to represent all of the aluminum present in the zeolite composition. Other non-cationic aluminum species such as forms of amorphous $Al_2O_3$ may also be present with the zeolite composition. This form of amorphous $Al_2O_3$ results from degradation to the zeolite that may occur as the result of a particular treatment. Presence of an amorphous $Al_2O_3$ phase will also have the effect of reducing the value of the Cation Equivalent, $M^+/Al$, since Al is taken to represent all of the Al present in the zeolite composition. It is obvious then, that a low value for the Cation Equivalent indicates the presence of a substantial amount of zeolite degradation or the presence of a substantial amount of cationic aluminum. The higher the value for the Cation Equivalent, the greater the amount of the compositional Al present in the framework of the zeolite.

It is advantageous to perform the routine chemical analysis on a form of the zeolite in which "M" is an equivalent monovalent cation other than hydrogen. This avoids the uncertainty which can arise in the case of divalent or polyvalent metal zeolite cations as to whether the full valence of the cation is employed in balancing the net negative charge associated with each $AlO_4^-$ tetrahedron.

The zeolites produced by the process described above are characterized in that they are substantially free of defect structures yet have a molar $SiO_2/Al_2O_3$ ratio higher than those obtained by direct hydrothermal synthesis. Generally, the $SiO_2/Al_2O_3$ molar ratio is greater than 6.5 and preferably greater than 11. Any defect structures, if present, are determined by the infrared spectrum of the zeolites in the hydroxyl-stretching region. A detailed explanation of defect structures and the method of determining them is found in U.S. Pat. No. 4,711,770 which is incorporated by reference.

As will be shown in detail in the examples, the compositions of the present invention have a different infrared spectrum than either the starting EMC-2 or a dealuminated EMC-2. Additionally, water adsorption curves for the EMC-2 and LZ-281 are virtually the same indicating that virtually no defects were introduced by the process of the present invention.

The zeolites of this invention are useful as catalysts or catalyst supports in any of several hydrocarbon conversion processes. If it is desired to deposit catalytic metals onto the instant zeolites, the zeolite can be impregnated or otherwise loaded with catalytically active metals by methods well known in the art (e.g., ion exchange or impregnation) and used, for example, in fabricating catalyst compositions having silica or alumina bases. Illustrative of the hydrocarbon conversion process which the instant zeolites (with or without additional catalytic metals) catalyze are: cracking, hydrocracking, alkylation of aromatics or isoparaffin, and isomerization including xylene isomerization. The product derived from any of these processes is generally referred to as a hydrocarbon converted product.

Specific conditions for the above-named reactions are well known in the art and generally depend on the type of hydrocarbon to be converted. Thus, the instant zeolites which may contain a hydrogenation promoter such as platinum or palladium can be used to hydrocrack heavy petroleum residual stocks, cyclic stocks and other hydrocrackable charge stocks at temperatures in the range of 400° F. to 825° F. (204° C. to 441° C.) using molar ratios of hydrogen to hydrocarbon in the range of between 2 and 80, pressures between 10 and 3500 psig (0.171 to 24.23 MPa), and a liquid hourly space velocity (LHSV) of from 0.1 to 20, preferably 1.0 to 10.

Catalytic cracking processes are preferably carried out with the instant zeolites using feedstocks such as gas oils, heavy naphthas, deasphalted crude oil residua, etc., with gasoline being the principal desired product. Temperature conditions of 850° to 1100° F. (454° to 593° C.), LHSV values of 0.5 to 10 and pressure conditions of from about 0 to 50 psig (101 to 446 kPa) are suitable.

Isomerization reactions are carried out under conditions similar to those described above for reforming using somewhat more acidic catalysts. Olefins are preferably isomerized at temperatures of 500°–900° F. (260°–482° C.), while paraffins, naphthenes and alkyl aromatics are isomerized at temperatures of 700°–1000° F. (371°–538° C.). Particularly desirable isomerization reactions contemplated herein include the conversion of n-heptene and/or n-octane to isoheptanes, iso-octanes, butane to iso-butane, methylcyclopentane to cyclodexane, meta-xylene and/or ortho-xylene to paraxylene, 1-butene to 2-butene and/or isobutene, n-hexane to isohexene, cyclohexene to methylcyclopentene, etc. The preferred form of the catalyst is a combination of the instant composition with polyvalent metal compounds (such as sulfides) of metals of Group II-A, Group II-B and rare earth metals. For alkylation and dealkylation processes the instant compositions having pores of at least 5 Å are preferred. When employed for dealkylation of alkyl aromatics, the temperature is usually at least 350° F. (177° C.) and ranges up to a temperature at which substantial cracking of the feedstock or conversion products occurs, generally up to about 700° F. (371° C.). The temperature is preferably at least 450° F. (232° C.) and not greater than the critical temperature of the compound undergoing dealkylation. Pressure conditions are applied to retain at least the aromatic feed in the liquid state. For alkylation the temperature can be as low as 250° F. (121° C.) but is preferably at least 350° F. (177° C.). In the alkylation of benzene, toluene and xylene, the preferred alkylating agents are olefins such as ethylene and propylene.

The following examples are presented in illustration of this invention and are not intended as undue limitations on the generally broad scope of the invention as set out in the appended claims.

EXAMPLE 1

Into a beaker 73 grams of NaOH were combined with 926 grams of deionized $H_2O$ and stirred until dissolved. Sodium aluminate (146 grams) was added to the aqueous NaOH solution and stirred until dissolved. To this solution there were added 120 grams of 18-Crown-6 ether and the mixture stirred until the ether dissolved. Next, 946 grams of silica gel (Ludox® AS-40) was slowly added and the resultant reaction mixture was stirred for 1.5 hours and then aged quiescently at room temperature for 25 hours. The resultant hydrogel was divided equally into two 2 liter Teflon® lined parr bombs and placed into a 113° C. oven for 6 days. The EMC-2 product was filtered and washed with deionized water until the pH of the filtrate was <10.0, and then dried at 110° C. overnight. Finally, the dried EMC-2 zeolite powder was calcined at 540° C. for 6 hours under flowing air and then cooled to room temperature.

The calcined EMC-2 was ammonium exchanged as follows. In a glass reaction flask equipped with a condenser there were added ammonium nitrate and deionized water in amounts of 1 g $NH_4NO_3$ per gram of EMC-2 to be exchanged and 5.6 grams deionized water per gram of EMC-2. The EMC-2 to be treated was now added and heated to 85° C. for 1 hour. After 1 hour, the slurry was washed with deionized water using 5 grams water/gram of EMC-2. This procedure was repeated two more times. Finally, the ammonium EMC-2 was dried at 110° C.

EXAMPLE 2

Into a beaker there were combined 110 grams (anhydrous basis) of the ammonium EMC-2 of Example 1 and 501.1 grams of deionized water. The slurry was stirred and heated to 75° C. In another container, 105.9 grams of deionized water was heated to 50° C. and to it there were added 26.5 grams of $(NH_4)_2SiF_6$. This mixture was mixed until all the solid was dissolved.

The ammonium fluorosilicate solution (AFS) was added to the zeolite slurry at a rate of 0.86 cc/min. The AFS solution was maintained at 50° C., while the slurry temperature was maintained at 75° C. After all the AFS solution was added, the slurry was stirred at 75° C. for an additional hour. Next, the hot slurry was filtered and washed with water at 50° C. until the filtrate was fluoride and aluminum free. The filtered material was dried at 50° C. overnight and identified as LZ-281. A comparison of the LZ-281 with the EMC-2 shows that LZ-281 has retained 96% of its crystallinity.

A comparison of the chemical and physical properties of the starting EMC-2 zeolite and the product LZ-281 zeolite is presented in Table 1.

TABLE 1

| Properties | $NH_4$EMC-2 | LZ-281 Product |
|---|---|---|
| $Na_2O$ (wt. % anhydrous) | 2.3 | 1.0 |
| $(NH_4)_2O$ (wt. % anhydrous) | 7.1 | 5.2 |
| $Al_2O_3$ (wt. % anhydrous) | 18.4 | 12.4 |
| $SiO_2$ (wt. % anhydrous) | 71.5 | 81.6 |
| F (wt. % anhydrous) | — | 0.05 |
| $SiO_2/Al_2O_3$ | 6.6 | 11.2 |
| $Na^+/Al$ | 0.21 | 0.14 |
| $NH_4^+/Al$ | 0.76 | 0.81 |
| Cation Equivalent, $M^+/Al$ | 0.97 | 0.95 |
| $M^+ = (Na^+ + NH_4^+)$ | | |
| X-ray Crystallinity | | |
| By peak area, % | 100 | 96 |
| Unit cell size (In Angstroms) | | |
| $a_0 =$ | 17.38 | 17.30 |
| $c_0 =$ | 28.45 | 28.27 |
| DTA - Crystal Collapse | | |
| Temp, ° C. | 970 | 1116 |
| Framework Infrared | | |
| Asymmetric Stretch, $cm^{-1}$ | 1036 | 1053 |
| Symmetric Stretch, $cm^{-1}$ | 795 | 812 |
| Hydroxyl Infrared | | |
| Absolute Adsorbance @ 3710 $cm^{-1}$ | 0.050 | 0.175 |
| Defect Structure Factor, Z | 0.021 | 0.074 |
| Surface Area | | |
| Single Point BET (sq. m/g) | 931 | 862 |
| Mc Bain Adsorption | | |
| Wt. % O2, 100 Torr, –183° C. | 35.3 | 32.9 |

The framework mole fractions of oxides are set forth below for the untreated $NH_4$ EMC-2 and the product LZ-281:

(a) Mole fraction of oxides ($TO_2$):

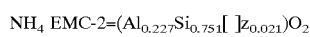

$NH_4$ EMC-2=$(Al_{0.227}Si_{0.751}[\ ]_{0.021})O_2$

LZ-281=$(Al_{0.141}Si_{0.785}[\ ]_{0.074})O_2$

EXAMPLE 3

The EMC-2 and LZ-281 zeolites were tested for hydrocarbon conversion activity using a heptane cracking test. One gram of sample was loaded into an electrically heated reactor. The sample was dried for 30 minutes at 200° C. followed by 60 minutes at 550° C. in flowing hydrogen. The temperature of the reactor was adjusted to 500° C. or 550°

C. The feedstream used to test each sample consisted of heptane saturated with hydrogen at 0° C. and atmospheric pressure. The feed stream was flowed through the catalyst at a rate of 125 cc/min. The effluent gas stream was analyzed using a gas chromatograph. What is measured is the percent of heptane that is cracked, isomerized, converted to naphthenes or aromatics. These results are presented in Table 2.

TABLE 2

Heptane Test Results for $NH_4$ EMC-2 and LZ-281

| Reaction | % Conv. at 500° C./550° C. | |
|---|---|---|
| | $NH_4$ EMC-2 | LZ-281 |
| Cracking | 21.5/58.1 | 37.0/72.4 |
| Naphthenes | 0.0/0.0 | 0.0/0.0 |
| Isomerization | 0.0/0.0 | 0.0/0.2 |
| Aromatics | 0.5/1.7 | 0.6/3.3 |
| Total Conversion (C + N + 1 + A) | 22.0/59.8 | 37.6/75.9 |

These results clearly indicate that the zeolite of this invention (LZ-281) has much better cracking activity than the starting EMC-2 zeolite. Increased cracking activity is an indication of increased number and/or strength of the acid sites.

EXAMPLE 4

A sample of EMC-2 was prepared as in Example 1. This sample was ammonium exchanged and then the silicon content increased as follows. The EMC-2 sample was first calcined in a muffle furnace at 538° C. for 6 hours. Next the calcined powder was ammonium exchanged by mixing a solution which was 15 wt. % $NH_4NO_3$ with the EMC-2 powder to give a 1:1 weight ratio of $NH_4NO_3$:EMC-2 powder. The resultant slurry was heated to 85° C. for 1 hour and then filtered and dried with deionized water in a ratio of 16.7/1 (water/EMC-2). This procedure was repeated two more times and then dried in an oven at 110° for 12 hours.

The $NH_4$-EMC-2 was now treated as follows to increase the silicon content. In a container there were mixed 142.05 grams of $NH_4$-EMC-2 and 501.1 grams of deionized water and the resultant slurry heated with stirring to 75° C. To this slurry there was added an aqueous solution of AFS (maintained at 50° C.) at a rate of 0.83 cc/min. The solution contained 20 wt. % AFS and was prepared by combining 26.48 g of AFS and 105.92 g of deionized water. After all the solution was added, the slurry was stirred at 75° C. for an additional hour. The slurry was now filtered and washed with hot (50° C.) deionized water until fluoride free and then dried at 50° C. overnight.

The dried powder was next steamed with 100% steam at 600° C. for 1 hour followed by two more ion exchange treatments as described above. The final LZ-281 product had the following properties.

| Property | LZ-281 |
|---|---|
| $Na_2O$, wt. % | 0.02 |
| $SiO_2$, wt. % | 88.1 |
| $Al_2O_3$, wt. % | 11.9 |

-continued

| Property | LZ-281 |
|---|---|
| $Si/Al_2$, molar | 12.56 |
| Surface area, $m^2/g$ | 862 |

The above LZ-281 was now formed into a catalyst as follows. Alumina (obtained from Catapal Inc.) was peptized in a muller by mixing with nitric acid in a ratio of 0.18 g $HNO_3$ per gram of volatile free $Al_2O_3$. To the peptized alumina, LZ-281 powder, $Ni(NO_3)_2.6H_2O$ and ammonium heptamolybdate powders were added in amounts to give a ratio of LZ-281/$Al_2O_3$ of 75/25, and 5 and 15 wt. % (percent of final catalyst) of NiO and $MoO_3$ respectively. The resultant dough was mulled for 60 minutes and then extruded to give 1.59 mm diameter cylindrical extrudates. The extrudates were then calcined in flowing air at a temperature of 510° C. for 1 hour. This catalyst was found to have 5.09 wt. % NiO and 15.75 wt. % $MoO_3$ and identified as catalyst A.

EXAMPLE 5

Catalyst A was tested for cracking activity as follows. A reactor was filled with 10 beds of catalyst, each bed containing 5 cc of catalyst A mixed with 15 cc of quartz chips. The feed used to test this catalyst had the following properties.

| IBP* | 385° F. |
|---|---|
| 5% | 453° F. |
| 20% | 517° F. |
| 40% | 564° F. |
| 60% | 605° F. |
| 80% | 671° F. |
| 90% | 716° F. |
| FBP* | 800° F. |

*IBP = initial boiling point, FBP = final boiling point.

The feed contained 11.4% aromatics, 3.5% olefins and 85.1% paraffin and naphthenes. To this feed there were added 4,900 ppm sulfur as di-t-butyl disulfide and 2,000 ppm nitrogen as cyclohexylamine. The feed along with hydrogen, at a level of 8000 standard cubic feet per barrel, is flowed through the catalyst at a liquid hourly space velocity of 1.7. The catalyst is heated to 400° F. at which point the feed is introduced and the temperature ramped until 60% of the feed is converted to a cracked product having a maximum boiling point of 550° F. or less.

The results of this test show that catalyst A achieved 60% conversion to product with a 550° F. boiling point at 690° F. In contrast, a reference catalyst prepared as in Example 4 but using zeolite Y requires a temperature of 694° F. to reach 60% conversion. A lower temperature indicates better activity. The catalyst of the invention also produced lower light ends (C1 to C5) versus the reference (10.14% vs. 11.19%).

EXAMPLE 6

Water adsorption isotherms were measured on a sample of calcined EMC-2 prepared as in example 1 and a sample of LZ-281 prepared as in example 2. Both samples were degassed at 300° C. prior to the adsorption measurements which were carried out at 20.5° C. by standard techniques.

Plots of % of maximum adsorption vs. $P/P_o$ are presented in the FIGURE. Comparing the two plots it is observed that the calcined EMC-2 sample exhibits an extreme Type I isotherm shape. Further, the LZ-281 sample exhibits an isotherm shape essentially parallel to the calcined EMC-2 sample. The minor displacement of the curve is expected because the water adsorption strength on zeolites diminishes as the $SiO_2/Al_2O_3$ ratio increases. The fact that the two curves are virtually the same indicates that the potential framework defects caused by dealumination have been filled by the substituted silicons.

In contrast to these results, it is observed in the prior art (See, U.S. Pat. No. 5,425,934, FIG. 6) that dealuminated zeolites have a different isotherm from their parent or starting zeolite. Particularly, in the $P/P_o$ range of 0.1 to 0.5 the dealuminated sample exhibits a much different, shallower slope indicating the presence of defects.

We claim as our invention:

1. A crystalline zeolitic aluminosilicate composition having at least some of its original framework aluminum atoms replaced by extraneous silicon atoms and having a mole ratio of oxides in the anhydrous state of $$aM_{2/n}O:Al_2O_3:xSiO_2$$

where M is a cation of valence "n", "a" has a value of about 0.90±0.2 and "x" has a value of greater than 11, the composition characterized in that it has the framework structure of EMT, a cation equivalency of at least 0.7 and an oxygen adsorption capacity of at least 70% of its theoretical capacity as measured at 100 torr and 90° K.

2. The composition of claim 1 where M is selected from the group consisting of ammonium, hydronium, alkali metals, alkaline earth metals and mixtures thereof.

3. A crystalline zeolitic aluminosilicate composition produced by the process of contacting an EMC-2 zeolite having a $SiO_2/Al_2O_3$ ratio of about 6.0 to about 10.0 with a fluorosilicate solution or slurry at a pH of about 3 to about 7, whereby framework aluminum atoms of the EMC-2 zeolite are removed and replaced by extraneous silicon atoms to give a composition having the EMT framework structure and an empirical formula of $$(Al_{(a-N)}Si_{b+(N-\Delta z)}[\ ]_{z1})O_2$$

where "(a–N)" is the mole fraction of aluminum atoms in the composition, "a" is the mole fraction of aluminum atoms in the EMC-2 zeolite, "N" is the mole fraction of aluminum atoms removed from the EMC-2 zeolite framework and is at least 0.03a, "b" is the mole fraction of silicon atoms in the EMC-2 zeolite framework, "(N–Δz) is the mole fraction increase in silicon atoms in the composition, "[ ]" is the framework defect sites, z1 is the mole fraction of defect sites in the composition and varies from greater than zero to about 0.15, "Δz" is the net change in the mole fraction of defect sites between the EMC-2 zeolite and the composition and is defined by Δz=z1−z where z is the mole fraction of defect sites in the EMC-2 zeolite and Δz has a value of less than 0.08, (N−Δz) is the mole fraction increase in silicon atoms in the composition and (a−N)+(b+(N−Δz))+z1=1.

4. A hydrocarbon conversion process comprising contacting a hydrocarbon fraction at hydrocarbon conversion conditions with a catalyst to give a converted product, the catalyst comprising a crystalline zeolite having at least some of its original framework aluminum atoms replaced by extraneous silicon atoms and having a mole ratio of oxides in the anhydrous state of $$aM_{2/n}:Al_2O_3:xSiO_2$$

where M is a cation of valence "n", "a" has a value of about 0.90±0.2 and "x" has a value greater than 11, the composition characterized in that it has the framework structure of zeolite EMT, a cation equivalency of at least 0.7 and an oxygen adsorption capacity of at least 70% of its theoretical capacity as measured at 100 torr and 90° K.

5. The process of claim 4 where the hydrocarbon conversion process is cracking.

6. The process of claim 4 where the hydrocarbon conversion process is hydrocracking.

* * * * *